United States Patent [19]

Loos et al.

[11] 4,190,387
[45] Feb. 26, 1980

[54] APPARATUS AND TOOL FOR PRECISION WORKING, PARTICULARLY SHAVING, OF GEARS

[75] Inventors: Herbert Loos, Dorfen; Manfred Heckmaier, Unterpfaffenhofen; Gerhard Reichert, Puchheim, all of Fed. Rep. of Germany

[73] Assignee: Carl Hurth Maschinen-und Zahnradfabrik, Munich, Fed. Rep. of Germany

[21] Appl. No.: 907,744

[22] Filed: May 19, 1978

Related U.S. Application Data

[62] Division of Ser. No. 767,153, Feb. 9, 1977, Pat. No. 4,119,014.

[30] Foreign Application Priority Data

Apr. 9, 1976 [DE] Fed. Rep. of Germany ....... 2615718

[51] Int. Cl.² .............................................. B23F 19/06
[52] U.S. Cl. .................................................... 409/33
[58] Field of Search ....... 90/1.6 R; 51/52 R, 105 GG

[56] References Cited

U.S. PATENT DOCUMENTS

| 3,213,754 | 10/1965 | Hurth et al. | 90/1.6 R |
| 3,245,320 | 4/1966 | Hurth | 90/1.6 R |
| 3,246,568 | 4/1966 | Hurth | 90/1.6 R |

Primary Examiner—Gil Weidenfeld
Attorney, Agent, or Firm—Blanchard, Flynn, Thiel, Boutell & Tanis

[57] ABSTRACT

An apparatus and tool for the precision working of gears, particularly by a gear shaving process. The process involves the step of changing the direction of rotation between the workpiece and the tool approximately starting with half of the advance path and the smallest distance between the axes. The optimum condition occurs when the direction of rotation is changed prior to reaching the smallest distance between the axes and the advance is directed at a right angle with respect to the axis of the workpiece or tool. The tool is rotatably supported on a spindle as is the workpiece. The workpiece is driven relative to the tool to advance same relative to the tool. Control devices are provided for controlling the movement of the workpiece relative to the tool. The tool has grooves which extend from the addendum to the dedendum and form cutting edges and the flanks of the teeth have concaved surfaces.

2 Claims, 5 Drawing Figures

APPARATUS AND TOOL FOR PRECISION WORKING, PARTICULARLY SHAVING, OF GEARS

This is a division of application Ser. No. 767,153, filed Feb. 9, 1977, now U.S. Pat. No. 4,119,014, issued Oct. 10, 1978.

FIELD OF THE INVENTION

The invention relates to an apparatus and tool for precision working, in particular precision shaving, of gears.

BACKGROUND OF THE INVENTION

The development of gear shaving (also gear honing) started with the so-called parallel shaving, this is a method, in which the advance or movement of the workpiece relative to the tool occurs with the axis of the tool extending parallel to the workpiece axis. For the purpose of the chip removal, the tool is moved in strokes relative to the workpiece. One started then to direct the relative advance of the axis of the tool angularly with respect to the workpiece axis, through which the operating time could be shortened and wherein the tool is worn more evenly because of the crossed-axes point wandering alongside of the tool teeth. In this method, which in the technical language is called diagonal shaving, the tool is also moved in strokes relative to the workpiece. During a further development, the direction of the advance was then swung so far that it was directed at a right angle with respect to the workpiece axis. A chip removal radially with respect to the workpiece axis (depth feed motion) no longer took place. The operating time was extremely shortened in this method which is called, in the technical language, underpass-shaving. In all abovedescribed methods there occurs a change in the direction of rotation of workpiece and tool at the end of the advance. (Hurth-gearshaving (1964)), Page 208 et seq.

Underpass shaving has led to a considerable reduction of the operating time, however, gears with an insufficient surface quality and with flank profile errors were produced. The latter were additionally worsened by being different on the right and left flank of the respective teeth. To reduce these deficiencies, one first varied the cutting speed and the advance speed, which was not sucessful. Then, during the course of a further development, a stepwise radial feed was introduced which, because of the time involved, was supposed to be avoided in particular by the underpass-shaving. Thus one fell back through the development of the underpass-method onto the diagonal method with stroke-like radial feed.

The basic purpose of the invention is to provide an apparatus which assures, on the one hand, the short operating time of the underpass-method, however, on the other hand, achieves a higher surface quality and tooth quality.

To attain this purpose, the inventors first examined the course of the chip removal during the advance, in particular by comparing the two sides of the workpiece teeth, namely during different advancing and cutting speeds, but this actually did not yet lead to any satisfactory result. Only an examination of the operations of the reciprocal action of flank and counterflank on the respective tooth side brought about the attainment of the set purpose.

The time period for the change in the direction of rotation exists inventively on the part of the advance path, on which chips are removed on both sides of the workpiece teeth. To determine the exact time period, one must note the geometry of the workpiece, the chip allowance, the workpiece width and the form of the elastic flattening, which in turn depends on the curvature radii of the tooth flanks, on the crossed-axes angle and contact pressure (see for this Hurth-gearing-shaving (1964) Page 220). The following tendency must be considered for the time period of the change in the direction of rotation. When the pitch diameter is large, the point of the change in the direction of rotation lies farther away from the point of the smallest distance between the geometric centers (common normal line) of workpiece and tool than in the case of a small pitch diameter, similarly in the case of a large working tolerance. The exact point of the change in the direction of rotation is determined advantageously by operating tests.

Of particular importance is the device for controlling the direction of rotation which is effective during the abovedescribed section of the advance. This device can consist substantially of cams and switches in the advance path or of a control roller or the like which runs synchronously with the advance or of a time relay which, starting out from a fix point of the advance, for example, the start of the same, causes after a predetermined time at a desired point of the advance the change of the direction of rotation. The device may also be a numerical or a different suited electric, hydraulic or pneumatic control.

In the case of high quality requirements, the speed (cutting speed) must also be changed dependent from the advance.

The device for controlling any operations is not limited to the exemplarily mentioned types, but it is possible to use all suited mechanical, electric, hydraulic or pneumatic controls.

Further advantages and characteristics of the invention can be taken from the following description.

BRIEF DESCRIPTION OF THE DRAWINGS

The invention will be discussed in connection with FIGS. 1 to 5.

DETAILED DESCRIPTION

Figure 1:
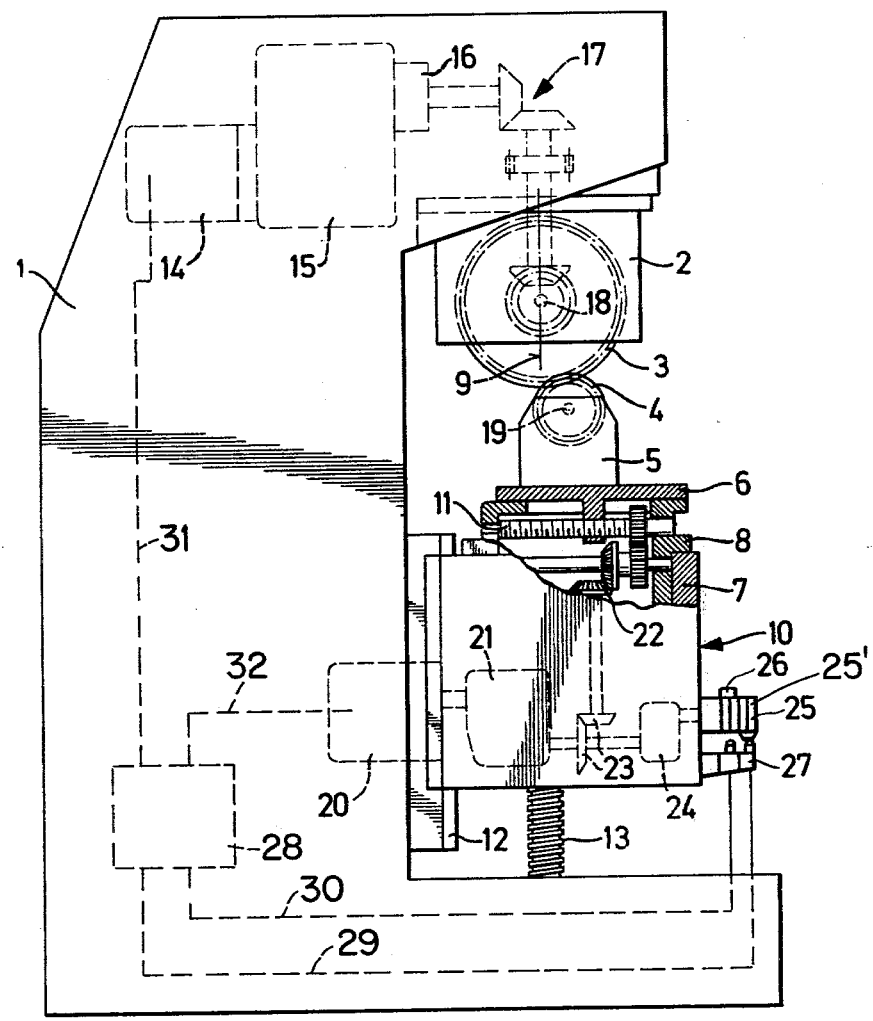
FIG. 1 is an example of a gear shaving machine for carrying out the method according to the invention.

The machine according to FIG. 1, on which the method according to the invention can be applied comprises substantially of a machine frame 1 which, in the example, is constructed as a so-called C-frame. The machine may, however, have any other suitable form. There is supported below the upper leg of the "C" a tool head 2 which is fixable and pivotal about a vertical axis. The tool, here a shaving gear 3, is rotatably and exchangeably supported in the tool head. The position of the shaving gear 3 is adjustable with the tool head 2 to a desired crossed axes angle $\theta$ (FIG. 2) with respect to the workpiece 4. The workpiece 4 is supported by means of tail-stocks 5 or the like on a carriage 6 which is movably supported on a console 7 in a carriage guide 8. The longitudinal axis of the carriage guide 8 extends at a right angle to the pivot axis 9 of the tool head 2 and also at a right angle to the axis of the workpiece 4 or to the axis of the spindle which receives the workpiece.

The carriage guide need not be pivotal about a vertical axis for the invention, however, it may exist for the purpose of versatility of the machine.

The carriage 6 can be driven by an electric or hydraulic motor 20 via a stepped or stepless change speed and reversing transmission 21 and an angle drive gearing, e.g. a bevel gear set 23, 22 and a spur gear set 22 A by means of a feed screw 11. Connected with the lower angle drive gearing or bevel gear set 23 is a further gearing 24 serving to drive a control drum 25. This control drum is provided with a plurality of adjustable cams 26 arranged to trip switches 27. The adjustment feature of the cams 26 relative to the control drum 25 is well known in the art and has not, therefore, been illustrated in any detail. The cams 26 are adjustably received in annular grooves 25' in the control drum 25. Each cam is selectively locked to the control drum by any convenient type of securement device as by a set screw. Because of a power train connection between the feed screw 11 and the control drum 25, the cams 26 are capable of giving feed-dependent signals for controlling the feed phases described in connection with FIGS. 2 and 3, which feed phases include increases and decreases in the velocity of the relative movement between the workpiece and the tool and aims the direction of rotation of the motor 14 used for driving the tool 3. The switches 27 are connected through lines 29 and 30 to a control unit 28 which is in turn connected to the motors 14 and 20 through lines 31 and 32.

Figure 2:
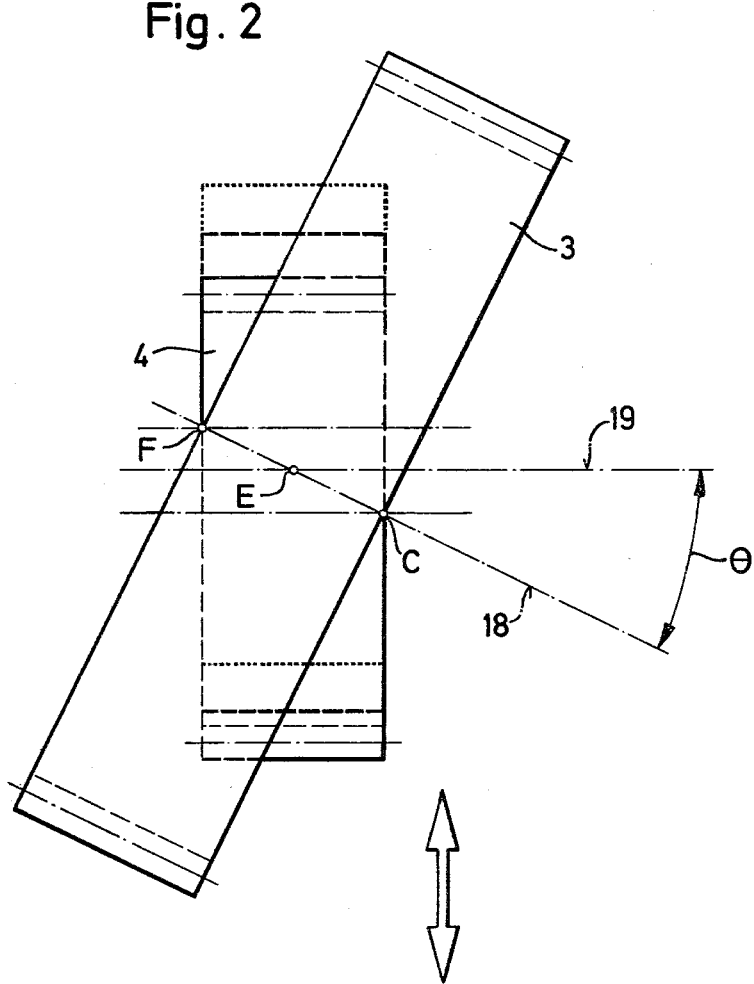
FIG. 2 is a schematical illustration of a tool and workpiece which carry out an advance relative to one another, just like in the so-called underpass method and in the inventive method. (Viewed from the tool onto the workpiece)
Figure 3:
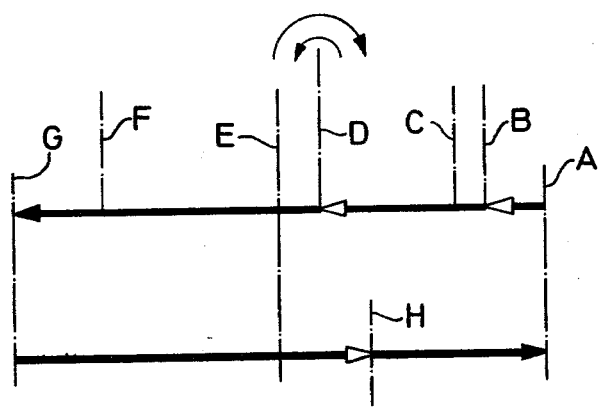
FIG. 3 is a schematical illustration of the sequence for the advance and return stroke in the method according to the invention. Different from the illustration in FIG. 3, the advance and the return stroke take place on the same line (in the same plane)

At the smallest space between the axes of the tool 3 and the workpiece 4 or the axes of the tool spindle and the workpiece spindle, the pivot axis 9 coincides with the common normal between the two axes of the tool and the workpiece (Point E in FIGS. 2 and 3). The console 7 is adjustably supported in height in a guideway 12 on the machine frame 1 and a drivable screw 13 is provided for this purpose.

An apparatus for a step-by-step or continuous chip supply radially with respect to the workpiece spindle is not provided for the invention, however, it can be provided for the purpose of the versatility of the machine.

The tool 3 is driven from a motor 14 through a transmission 15 and/or change gear system a reversing gear 16 and angle drive gearing 17. The described drives are only mentioned exemplarily, it is also possible to provide other suitable types of drives, for example, hydraulic or pneumatic or other drives.

The shaving gear and the tool roll along one another during shaving, the advance starts, according to FIG. 1, on the right side of the shaving gear 3 and with a loose tooth engagement, extends toward the left through the common normal line 9 position until the advance ends on the left side of the tool, right side of the workpiece 4; the workpiece 4 is thereafter returned to the right to the starting point of the advance. Control impulses are thereby given inventively, which will be described more in detail hereinbelow. The control means like the control unit 28, cams, switches, cam drums, NC-controls and the like are known and, therefore, not described. For the invention, it is only of importance at which place on the advance path and with which action the control means work.

FIG. 2 schematically illustrates the advance path of the workpiece 4 relative to the tool (shaving gear 3) in the known underpass-shaving and at the same time in the inventive method. The axis 18 of the tool spindle crosses the axis 19 of the workpiece spindle with the so-called crossed-axes angle $\theta$. At the start of the advance with a clearance-free mating, the crossed-axes point C lies on the right sides of the workpiece and the tool (workpiece 4 is shown in full lines). During a further advance, the workpiece axis crosses the condition of the smallest distance between the geometric centers of the tool and the workpiece. The crossed-axes point E coincides with the common normal line 9 (in the case of workpieces with or without symmetric width camber point D lies in the gear center). The shifted position of the workpiece is shown with broken lines in FIG. 2. The condition of the clearance-free mating ends when the crossed-axes point F lies on the left front sides of the tool and the workpiece. The further shifted position of the workpiece is shown with dotted lines. Due to the fact that the crossed-axes point moves over the entire width of the tool, same is evenly machined.

Decisive for the success of the process is the place at which the direction of rotation and furthermore the speed of the advance is changed. These operations are discussed in connection with the diagram of FIG. 3. In FIG. 3 it must be noted that the line curves for advance and return stroke and superposed on one another in reality.

The advance of the workpiece 4 relative to the tool 3 (FIGS. 1 and 2) starts at point A (FIG. 3) with a loose engagement between the teeth and at a fast speed. Shortly before the teeth start to mate without clearance therebetween, the advance is reduced to the operating speed at point B. Chip removal starts at point C and with a clearance-free engagement on both sides of the workpiece teeth. After the crossed-axes point has covered half of the path to the crossed-axes point E on the common normal line, the direction of rotation of the tool is changed at point D. For this purpose, the advance or position of the workpiece remains for a predetermined time at point D. If the change in the direction of rotation occurs too late, then already in the first direction of rotation so much material would be shaved off from the workpiece flanks that, for the second direction of rotation, sufficient machining allowance no longer exists in order to compensate for the errors generated in the first direction of rotation. The advance or movement of the workpiece passes then through the point E whereat the smallest distance between axes exists to the point F whereat the tooth flanks start to separate from one another. The advance terminates at point G. The return stroke takes place with the same direction of rotation differing from the known methods. Two alternatives can be provided for the return stroke. Either the return stroke extends from point G to H, a point on the other side of E, with reduced return stroke speed or the return stroke takes place first with the same speed as the advance up to point E. Approximately at point E the return stroke is then reduced to a greatly reduced speed so that the stresses which are stored in the device (machine) during the working and elastic deformations have time to release. The operation of the release of the stresses terminates at point H and the return stroke is switched over to a rapid-return motion. The operation terminates at point A.

In order to control the aforesaid operation, the transmission ratio of the gearing 24 is selected so that the control drum 25 performs during a working procedure a maximum rotation. Each of the cams 26 are selectively positioned on the control drum 25 to sequentially activate one of the plural switches 27. For example, the cams 26 and switches 27 will control the point in time that a change in speed of the motors 14 and 20 occurs, the point in time that the direction of rotation is changed and the point in time that the direction of travel of the carriage 6 is changed. These points in time have been discussed above and are represented as points B, D, G, H and A in FIG. 3. The cams 26 which control the switching at points B and D are angularly spaced from one another, which angle corresponds to the advancement from point B to point D. Thus, and when a cam 26 activates a switch 27, a circuit in the control unit 28 is activated to switch the motors 14 and 20 to a different speed (or one of the gearings 16 and 21 to a different direction of rotation).

The release of stresses is of determining importance for the surface quality of the workpiece teeth and has, therefore, also importance for the conventional so-called underpass-shaving.

Figure 4:
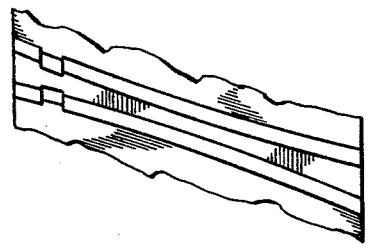
FIG. 4 is a shaving gear tooth having a spherical concave flank surface in longitudinal direction. Only one cutting groove of one whole row is shown per tooth side, viewed onto the tooth addendum.
Figure 5:
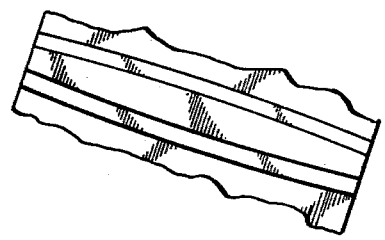
FIG. 5 illustrates spherical convex flank surface on a workpiece tooth, viewed onto the tooth addendum.

FIG. 4 schematically illustrates an example of a tool tooth having spherical concave flanks extending in the longitudinal direction. This hollow camber or concave surface is needed for both workpieces with teeth which have parallel flank lines (no camber) and also for workpieces with spherical convex flanks on the teeth (FIG. 5). It is important for the invention that the hollow camber does not engage over the entire tooth width to the workpiece. Otherwise, no distinct crossed-axes point (like for example during plunge shaving) would be obtained and it would not be possible to define a certain point D on the advance path for changing the direction of rotation.

With respect to the diagram of FIG. 3, it must be stated additionally that the advance speed from D to G can be quicker than from C to D. F may coincide with G. The return stroke speed from G to E can practically be any speed, for example as fast as from D to G. However, it is important to have a very slow speed from E to H.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Machine tool apparatus for shaving gear-shaped workpieces, comprising:
   a machine frame;
   first and second rotatable spindles on said frame, the axis of rotation of said first spindle being skewed relative to the axis of rotation of said second spindle;
   a gear shaving tool mounted on one of said first and second spindles and a workpiece mounted on the other of said first and second spindles;
   a carriage for moving said first spindle relative to said second spindle;
   means for adjusting the distance between the geometric centers of the tool and the workpiece in one single selectable plane, which lies at a right angle to a common perpendicular to the axes of said first and second spindle at the smallest spacing between said geometric centers of said workpiece and said tool;
   first reversible drive means for rotating one of said first and second spindles;
   second reversible drive means for advancing one of said spindles relative to the other thereof in said one single selectable plane;
   detecting means for detecting the position of the carriage relative to said second spindle and indicating the position through the issuance of plural signals; and
   means responsive to a first one of said plural signals for controlling the speed of advancement and retraction of said first spindle relative to said second spindle and to a second one of said plural signals for controlling the direction of rotation of said first drive means to thereby control the direction of rotation of said first spindle, all as a function of the spacing between a reference position for said carriage and an actual position thereof.

2. Apparatus according to claim 1, wherein said reference position for said carriage is the starting position thereof.

* * * * *